Patented June 24, 1947

2,422,740

UNITED STATES PATENT OFFICE 2,422,740

2-THIOCYANOMETHYL-5-HYDROXY-1,4-PYRONE AND METHOD FOR PREPARING IT

Glen H. Morey, Terre Haute, Ind., assignor to Commercial Solvents Corporation, Terre Haute, Ind., a corporation of Maryland No Drawing. Application November 27, 1944, Serial No. 565,410

4 Claims. (Cl. 260—333)

This invention relates to 2-thiocyanomethyl-5-hydroxy-1,4-pyrone, and to a method for preparing it.

This new compound may be represented by the formula:

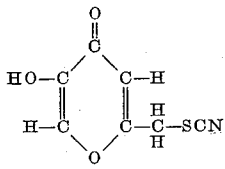

In carrying out my invention, I prepare the new compound by mixing a 2-halomethyl-5-hydroxy-1,4-pyrone with an alkali or alkaline earth metal thiocyanate in the presence of a solvent which is otherwise inert to the reaction. The solvent may be either a mutual solvent for both the reactants or it may be a solvent for only one and the other reactant may be present in suspension form, however, I prefer to use a mutual solvent. Suitable solvents are the lower alcohols, ethers, acetals, dioxane, etc., and preferably those with relatively low boiling points, for example, below about 100° C., for convenient refluxing at mildly elevated temperatures. The mixture may be stirred, and mildly heated, conveniently by refluxing in the low boiling solvent mixture, until the reaction is complete, usually an hour or two is sufficient. The alkali halide precipitates as formed, along with some of the desired reaction product. After completion of the reaction, the alkali halide may be removed, for example by filtration, separated from the pyrone reaction product as by dissolving in water or this portion may be discarded if desired. The original filtrate contains the greater proportion of the product which may be separated by cooling to room temperature and filtering or by any desired means.

The 2-halomethyl-5-hydroxy-1,4-pyrones from which my new compound is prepared, may be prepared according to any desired known methods. One method by which they can conveniently be prepared is by halogenating kojic acid, for example, by refluxing a mixture of kojic acid suspended in an inert liquid such as benzene with a chlorinating agent such as thionyl chloride. By substituting this halogen with a thiocyanate group according to my invention, the new 2-thiocyanomethyl-5-hydroxy-1,4-pyrone is formed.

My invention is further illustrated by the following specific example.

Example

One hundred and seven parts of 2-chloromethyl-5-hydroxy-1,4-pyrone, and 64 parts of potassium thiocyanate representing equimolecular proportions of the two compounds and 1,000 parts of 95% ethyl alcohol were placed in a reaction vessel fitted with a mercury seal stirrer and a reflux condenser. The mixture was stirred and heated. Before refluxing temperature was reached, all of the material dissolved. The mixture was refluxed for two hours, cooled and filtered of the crystals which formed. These crystals contained a small quantity of product mixed with some potassium chloride. The crystals were washed with hot water to dissolve the potassium chloride, then cooled and filtered. The remaining crystals were the product. The original alcohol filtrate was likewise cooled, whereupon a large quantity of crystals appeared. These were filtered out, and combined with the first washed crystals. The combined product was dried in vacuo and amounted to 116 parts corresponding to a yield of 95% of 2-thiocyanomethyl-5-hydroxy-1,4-pyrone. The product was analyzed for sulfur. Found, 17.15%; theory, 17.5%.

My new compound is useful as an intermediate in the preparation of organic compounds and is especially valuable in the preparation of intermediates for the preparation of insecticides.

While the above describes the preferred embodiments of my invention, it will be understood that departures may be made therefrom within the scope of the specification and claims.

What is claimed is:

1. 2-thiocyanomethyl-5-hydroxy - 1,4 - pyrone having the following structural formula:

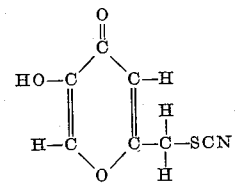

2. In a process for preparing 2-thiocyanomethyl-5-hydroxy-1,4-pyrone, the step which comprises mixing a 2-halomethyl-5-hydroxy-1,4- pyrone with a thiocyanate selected from the group consisting of alkali metal thiocyanates and alkaline earth metal thiocyanates and with an inert solvent and heating the mixture to reactive temperatures under refluxing conditions.

3. In a process for preparing 2-thiocyanomethyl-5-hydroxy-1,4-pyrone, the step which comprises mixing approximately equimolecular portions of 2-chloromethyl-5-hydroxy-1,4-pyrone and an alkali thiocyanate in the presence of an inert solvent, and refluxing the mixture until reaction is substantially complete.

4. In a process for preparing 2-thiocyanomethyl-5-hydroxy-1,4-pyrone, the step which comprises mixing 2-chloromethyl-5-hydroxy-1,4-pyrone with potassium thiocyanate and 95% ethyl alcohol, refluxing until reaction is complete, and thereafter recovering the 2-thiocyanomethyl-5-hydroxy-1,4-pyrone.

GLEN H. MOREY.

REFERENCES CITED

The following references are of record in the file of this patent:

UNITED STATES PATENTS

| Number | Name | Date |
|---|---|---|
| 2,069,166 | Kharasch | Jan. 26, 1937 |

OTHER REFERENCES

Beilstein, 4th edition, 18, page 343; ibid., 6, page 460.

Chemical Abstracts, 1929, 23, page 5472; ibid., 1943, 37, page 6277.

Richter, Textbook of Organic Chemistry, 1938, page 265. Wiley & Sons, Inc.